US012664693B2

(12) United States Patent
Kadam et al.

(10) Patent No.: US 12,664,693 B2
(45) Date of Patent: Jun. 23, 2026

(54) METHOD TO GENERATE FOR GLOBAL DISPLACEMENT TRANSFORMATION IN MESH COMPRESSION

(71) Applicant: Tencent America LLC, Palo Alto, CA (US)

(72) Inventors: Pranav Kadam, Palo Alto, CA (US); Shan Liu, Palo Alto, CA (US); Chao Huang, Palo Alto, CA (US); Thuong Nguyen Canh, Palo Alto, CA (US); Xiaozhong Xu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 219 days.

(21) Appl. No.: 18/605,306

(22) Filed: Mar. 14, 2024

(65) Prior Publication Data

US 2024/0331204 A1    Oct. 3, 2024

Related U.S. Application Data

(60) Provisional application No. 63/456,774, filed on Apr. 3, 2023.

(51) Int. Cl.
G06T 9/00 (2006.01)
G06T 3/14 (2024.01)
(Continued)

(52) U.S. Cl.
CPC ................ G06T 9/001 (2013.01); G06T 3/14 (2024.01); G06T 3/60 (2013.01); G06T 7/68 (2017.01);
(Continued)

(58) Field of Classification Search
CPC . G06T 2207/20021; G06T 2207/20048; G06T 3/14; G06T 3/60; G06T 7/68; G06T 9/001; H04N 19/50
See application file for complete search history.

(56) References Cited

U.S. PATENT DOCUMENTS 4,686,630 A * 8/1987 Marsland .................. H02J 3/14
307/39
2014/0300598 A1 10/2014 Ahn et al.
(Continued)

FOREIGN PATENT DOCUMENTS

CN        106022267 A * 10/2016 ........... G06V 40/169

OTHER PUBLICATIONS

International Search Report issued Jul. 12, 2024 in International Application No. PCT/US 24/22754.
(Continued)

*Primary Examiner* — Ming Wu
(74) *Attorney, Agent, or Firm* — Sughrue Mion, PLLC

(57)    ABSTRACT

A method of encoding a mesh includes determining a symmetry plane that divides the mesh into a first side and a second side opposite the first side, the mesh comprising a plurality of vertices, the first side comprising a first set of vertices, the second side comprising a second set of vertices; determining, for each vertex in the first set, a predicted vertex on the second side that is symmetric to a corresponding vertex in the first set; determining a transformation function that transforms each predicted vertex on the second side, the transformation function determined in accordance with a loss function; applying the transformation function that transforms each predicted vertex on the second side; determining a displacement vector between each transformed predicted vertex and a corresponding vertex in the second set; and generating a bitstream that comprises each encoded vertex in the first set and each displacement vector.

16 Claims, 7 Drawing Sheets

(51) Int. Cl.
    *G06T 3/60*         (2024.01)
    *G06T 7/68*         (2017.01)

(52) U.S. Cl.
    CPC .............. *G06T 2207/20021* (2013.01); *G06T 2207/20048* (2013.01)

(56) References Cited

U.S. PATENT DOCUMENTS

| | | | |
|---|---|---|---|
| 2020/0265552 A1* | 8/2020 | Hemmer | ............... G06T 17/205 |
| 2020/0356011 A1* | 11/2020 | Su | ....................... G03F 7/70441 |
| 2021/0136395 A1 | 5/2021 | Jun et al. | |
| 2024/0029316 A1 | 1/2024 | Nguyen Canh et al. | |

OTHER PUBLICATIONS

Written Opinion issued Jul. 12, 2024 in International Application No. PCT/US 24/22754.

Aleksey Golovinskiy, et al., "Symmetry-Aware Mesh Processing", Mathematics of Surfaces 2009, Sep. 2009 (19 pages total) Retrieved from the Internet: https://gfx.cs.princeton.edu/pubs/Golovinskiy_2009_SMP/index.php.

Qian-Yi Zhou, et al., "Fast Global Registration," Intel Labs, Computer Vision—ECCV 2016: 14th European Conference, 2016, pp. 1-16.

Paul J. Besl, et al., "A Method for Registration of 3-D Shapes," IEEE Transactions on Pattern Analysis and Machine Intelligence, vol. 14, No. 2, 1992, pp. 239-256.

Heng Yang, et al., "TEASER: Fast and Certifiable Point Cloud Registration," IEEE Transactions on Robotics (T-RO), 2020, pp. 1-44.

* cited by examiner

METHOD TO GENERATE FOR GLOBAL DISPLACEMENT TRANSFORMATION IN MESH COMPRESSION

CROSS-REFERENCE TO RELATED APPLICATION

This application claims priority from U.S. Provisional Application No. 63/456,774 filed on Apr. 3, 2023, the disclosure of which is incorporated herein by reference in its entirety.

FIELD

This disclosure is directed to a set of advanced video coding technologies. More specifically, the present disclosure is directed to generating a global displacement transformations and vectors.

BACKGROUND

Similar to other media format data compression, prediction is often used in mesh compression, where displacement vectors are assigned to each vertex of a mesh or a subdivision of a mesh, to indicate the difference between the predicted attributes (e.g., vertex coordinates) and the original attributes. The prediction may come from corresponding vertices in a previously coded mesh frame, a lower resolution mesh, or vertices in different subdivision of the same mesh frame. The displacements are then coded into the compressed mesh bitstream.

Some meshes have symmetric characteristic and thus one half (or part) of the mesh may be predicted from the other half (part). For example, a prediction of the right mesh may be first generated using the reconstructed left mesh and the symmetry plane. Then, for each vertex in the predicted right mesh, a displacement vector is calculated and coded, so that the displaced mesh can closely resemble the original right mesh. In the rest of this disclosure, we refer the predictor is from the "left mesh" and the to-be-predicted part as the "right mesh" only for simplicity. The disclosed methods can be applied to other general cases such as using a selected first part of a mesh to predict the second part.

It is observed that sometimes the predicted right mesh may not be well aligned with the true right mesh. This can lead to displacement vectors of large magnitude. The non-optimal alignment may be due to several reasons such as inappropriate symmetry plane detection or due to differences between the original and reconstructed left mesh.

SUMMARY

According to one or more embodiments, a method of encoding a mesh, comprises: determining a symmetry plane that divides the mesh into a first side and a second side opposite the first side, the mesh comprising a plurality of vertices, the first side comprising a first set of vertices, the second side comprising a second set of vertices; determining, for each vertex in the first set, a predicted vertex on the second side that is symmetric to a corresponding vertex in the first set; determining a transformation function that transforms each predicted vertex on the second side, the transformation function determined in accordance with a loss function; applying the transformation function that transforms each predicted vertex on the second side; determining a displacement vector between each transformed predicted vertex and a corresponding vertex in the second set; and generating a bitstream that comprises each encoded vertex in the first set and each displacement vector.

According to one or more embodiments, a method of encoding a mesh, comprising: generating a bitstream that comprises a portion of the mesh, wherein a symmetry plane is determined that divides the mesh into a first side and a second side opposite the first side, the mesh comprising a plurality of vertices, the first side comprising a first set of vertices, the second side comprising a second set of vertices, wherein, for each vertex in the first set, a predicted vertex on the second side that is symmetric to a corresponding vertex in the first set is determined, wherein a transformation function is determined that transforms each predicted vertex on the second side, the transformation function determined in accordance with a loss function; wherein the transformation function that transforms each predicted vertex on the second side is applied, wherein a displacement vector between each transformed predicted vertex and a corresponding vertex in the second set is determined, and wherein the portion of the mesh in the bitstream comprises each vertex in the first set and each displacement vector.

According to one or more embodiments, a method decoding an encoded mesh, comprising: receiving a bitstream comprising the encoded mesh, wherein the mesh is divided by a symmetry plane that divides the mesh into a first side and a second side opposite the first side, the mesh comprising a plurality of vertices, the first side comprising a first set of vertices, the second side comprising a second set of vertices, wherein, for each vertex in the first set, a predicted vertex on the second side that is symmetric to a corresponding vertex in the first set is determined, wherein a transformation function is determined that transforms each predicted vertex on the second side, the transformation function determined in accordance with a loss function, wherein the transformation function that transforms each predicted vertex on the second side is applied, wherein a displacement vector between each transformed predicted vertex and a corresponding vertex in the second set is determined, and wherein the bitstream comprises each encoded vertex in the first set and each displacement vector.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
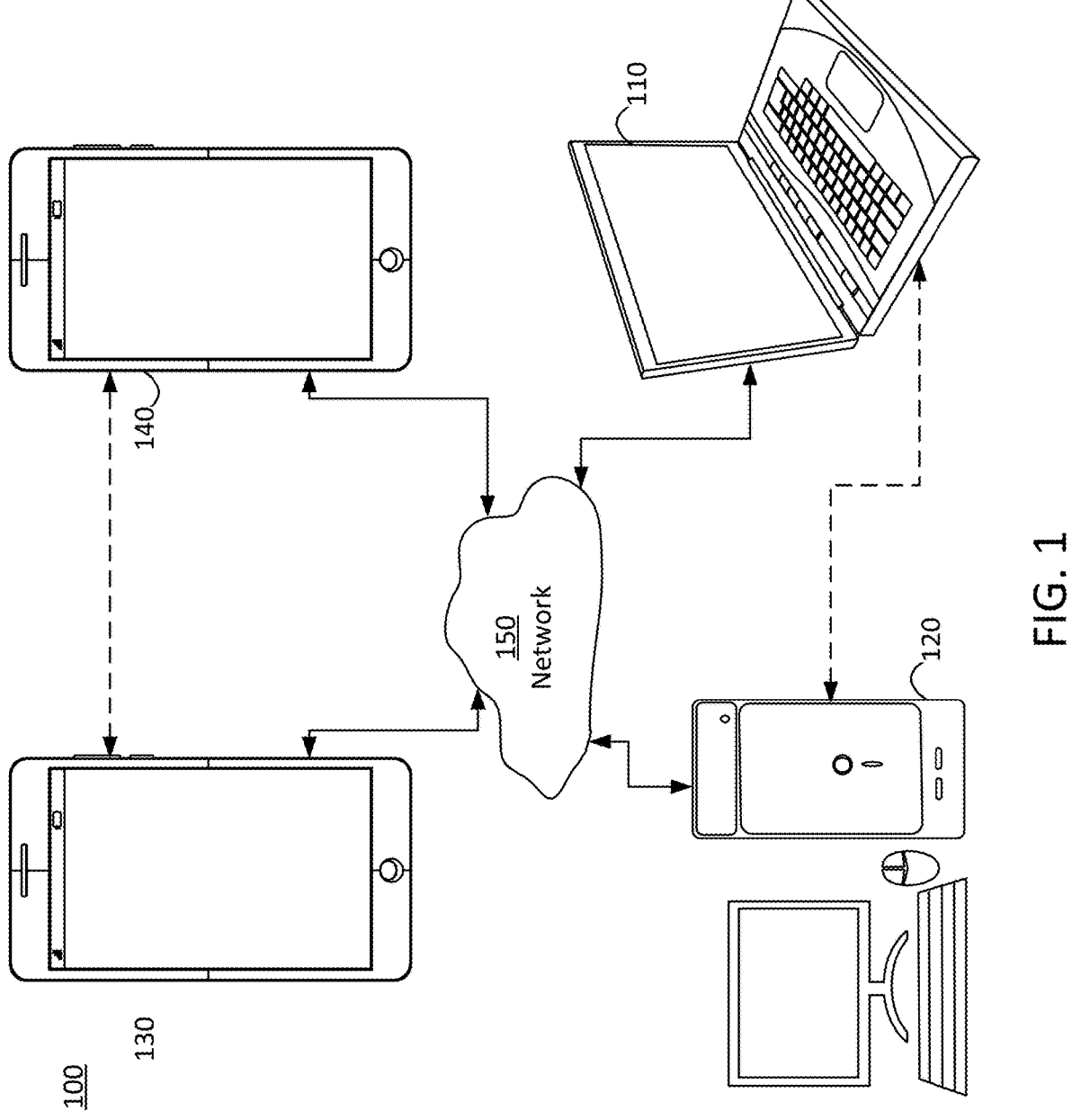
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
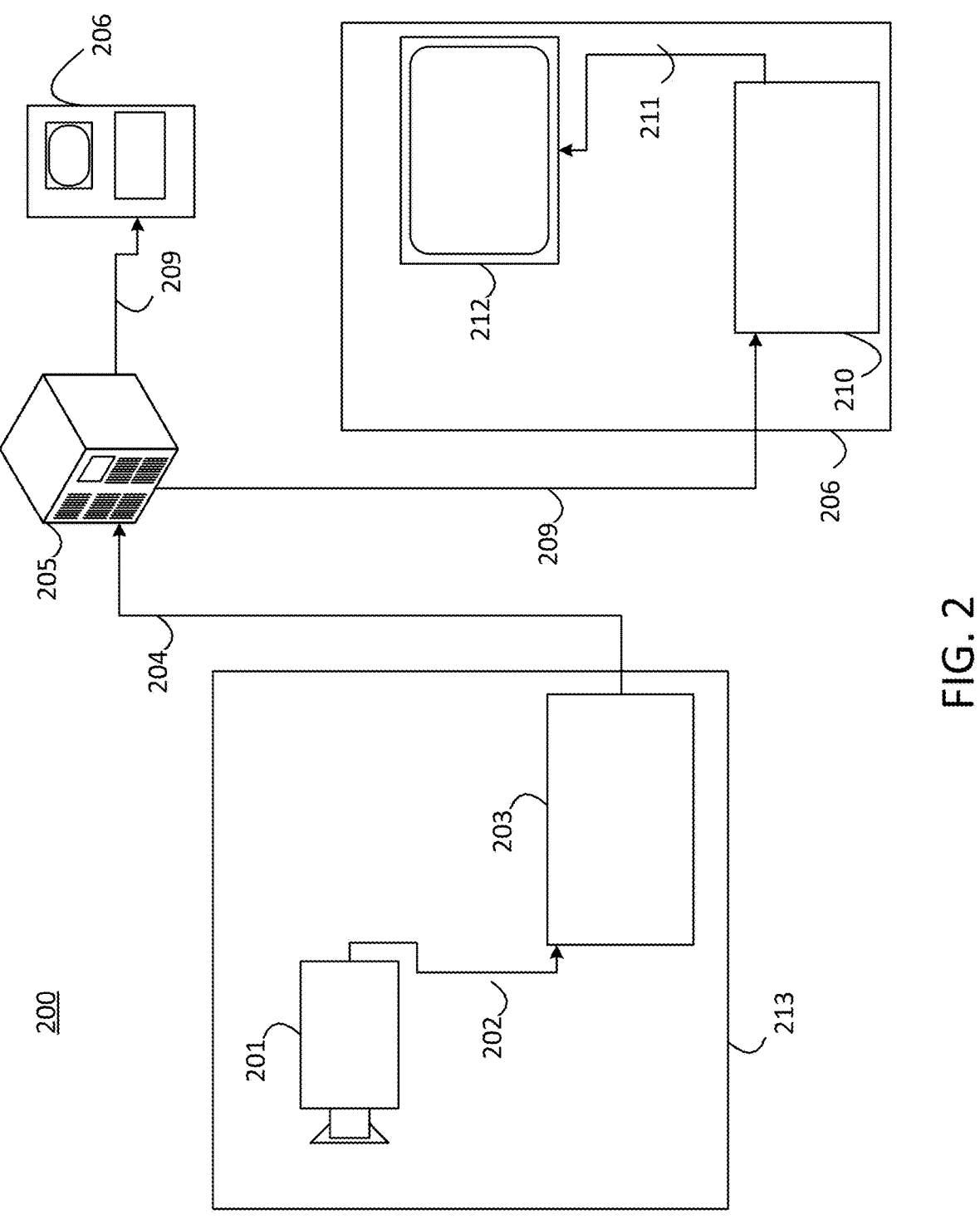
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device. In some streaming systems, the video bitstreams 204, 209 may be encoded according to certain video coding/compression standards.

A mesh is composed of several polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps. This standard targets lossy, and lossless compression for various applications, such as real-time communications, storage, free viewpoint video, AR and VR. Functionalities such as random access and scalable/progressive coding are also considered.

Mesh geometry information consists of vertex connectivity information, 3D coordinates, and 2D texture coordinates, etc. The compression of vertex 3D coordinates, which is also called vertex position, is very important, as in most cases, it takes up significant portion of the entire geometry related data.

Embodiments of the present disclosure are directed to generating global displacement transformations and vectors.

According to one or more embodiments, a non-optimal alignment problem is solved by introducing a global displacement transformation to align the predicted right mesh with the original right mesh. The global transformation can take care of large displacement errors and later the local displacement vectors can be used to obtain a tighter match.

In one or more examples, a global rigid transformation consisting of 3D rotation, 3D scaling, and 3D translation that optimally aligns the predicted right mesh with the original right mesh is calculated. Then, the global transformation is applied to all the vertices of the predicted right mesh to generate the new predicted right mesh (e.g., "transformed predicted right mesh"). Further, a local displacement vector is attached to each vertex of the transformed predicted right mesh. In one or more examples, the global transformation can be calculated and applied to set of partially cut meshes, based on which way is more optimal. Applying the global transformation to partial meshes may be helpful in scenarios where meshes exhibit local rigidity. The steps to calculate global and local symmetric displacements are detailed below, in accordance with one or more embodiments.

Figure 3:
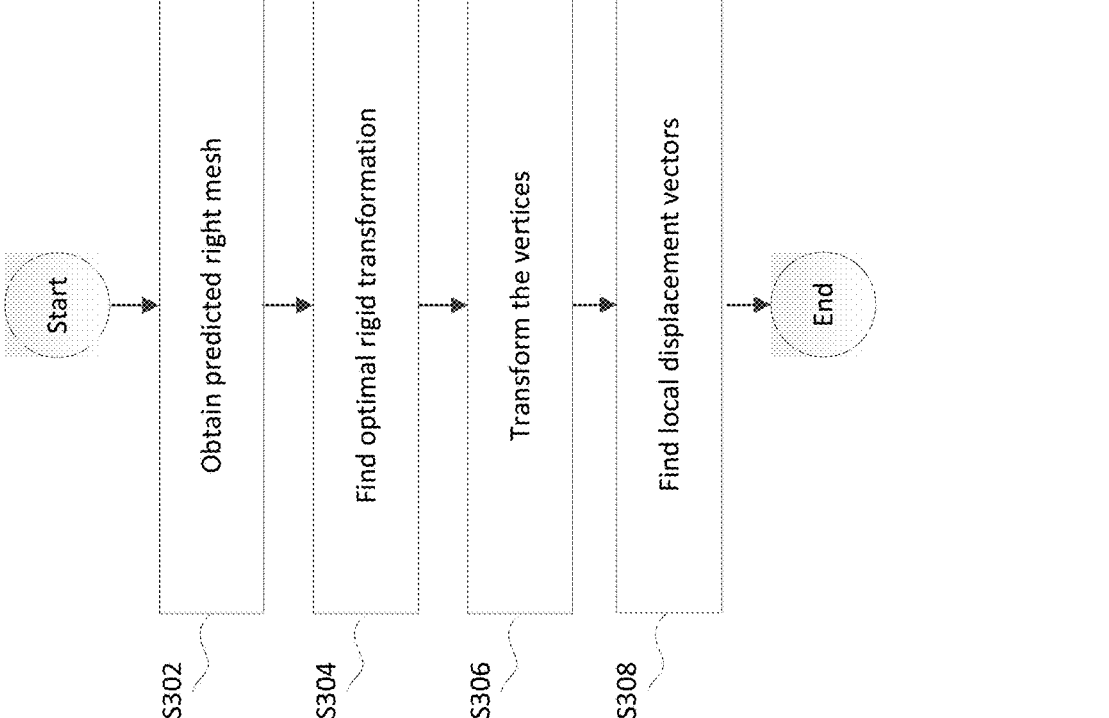
FIG. 3 illustrates a flowchart of an example process performed by an encoder, in accordance with embodiments of the present disclosure.

FIG. 3 illustrate a flowchart of an embodiment of a process 300 performed by an encoder. The process 300 may be performed by encoder 203.

The process may start at operation S302 where a predicted right mesh is obtained. The predicted right mesh may be obtained by reflecting the reconstructed left mesh about the symmetry plane. In one or more examples, a symmetrical plane is determined and signaled. A part of the mesh is selected as the left mesh and coded. Based on these two, the predicted right mesh is generated by mirror reflecting the decoded left mesh, using the signaled plane.

Figure 4:
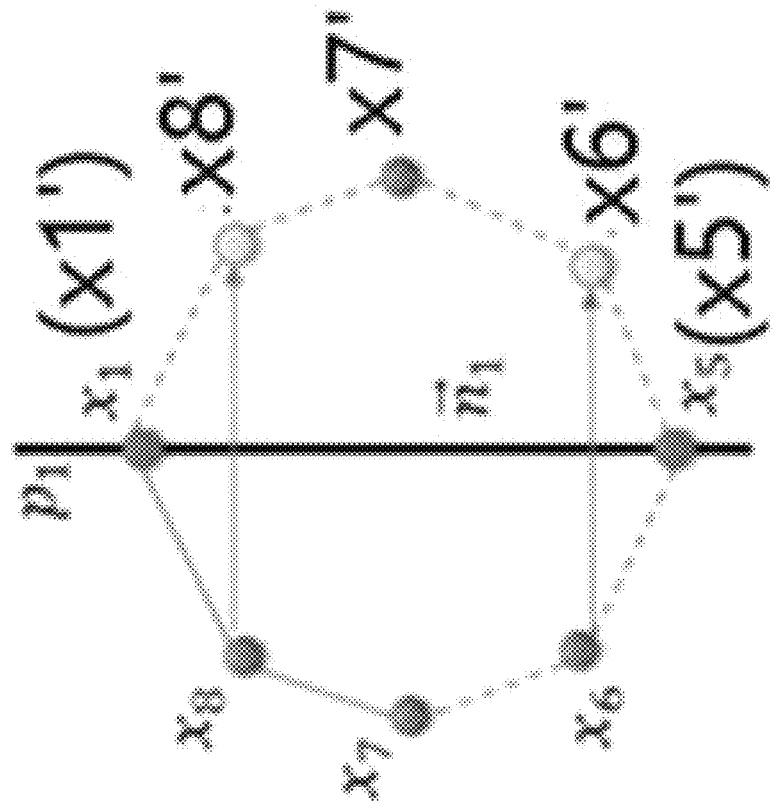
FIG. 4 illustrates an example of a mesh with symmetric prediction, in accordance with embodiments of the present disclosure.

FIG. 4 illustrates an example of symmetrical prediction using mirror reflection. The plane p1 is the symmetrical plane; Vertex V' (right mesh) is symmetrically predicted from V (left mesh); x1' and x1, x5 and x5' are vertices collocated on the plane. Vertices $X_6$, $X_7$, and $X_8$ are vertices in the left mesh, and vertices $X_{6'}$, $X_{7'}$, and $X_{8'}$ are the predicted vertices in the right mesh.

The process proceeds to operation S304, where an optimal rigid transformation is found. In one or more examples, the optimal rigid transformation aligns the predicted right mesh with the original right mesh subject to a loss function. For this, a global and/or local registration algorithm such as Iterative Closest Point (ICP), Fast Global Registration (FGR), and TEASER may be used. The registration algorithm may consider the vertices of the two meshes and disregards connectivity, or jointly consider vertices and connectivity. The registration algorithm gives the 3D rigid transformation $[R, \bar{t}]$ (e.g., 3D rotation and 3D translation).

In one or more examples, several loss functions may be considered. In one or more embodiments, the loss function is the Mean Square Error between vertex correspondences in registration. This loss reduces the magnitude of the local displacement vectors found in operation S308.

In another embodiment, the loss function includes the cost of encoding the displacements. This embodiments finds the optimal transformation that uses fewer bits to encode the displacements (e.g., the magnitude of local displacement vectors may or may not be the smallest possible magnitudes in this case). This loss reduces the number of bits required to code the global transformation as well as the local displacements found in operation S308. Multiple loss functions may be jointly considered, such as defining a new loss function which is a sum of the Mean Square Error and the number of bits required to code the displacement vectors. Similarly, a loss function can be defined as the weighted sum of Mean Square Error and the number of bits required to code the displacement vectors.

The process proceeds to operation S306 to transform the vertices of the predicted right mesh to obtain the transformed predicted right mesh. The 3D transformation may be applied to all the vertices of the predicted right mesh. The new vertex coordinates for the i-th vertex $\hat{r}_i$ of the predicted right mesh are given by $R\hat{r}_i + \bar{t}$.

The process proceeds to operation S308 to find the local displacement vectors for each vertex of the transformed predicted right mesh. In one or more examples, the transformed predicted right mesh is compared with the original right mesh and local displacements are found to further modify the vertices of the transformed predicted right mesh and make it resemble the original right mesh.

The embodiments of the present disclosure decompose the displacement information (or the prediction error) into two components—(1) a global displacement transformation which is first applied to all the vertices (same for all vertices), followed by (2) a local displacement vector which is unique to each vertex. The framework may be agnostic of the method used to obtain the global transformation (e.g., registration or other similar approach) as well as the approach used to calculate the local displacements.

Figures 5A, 5B:
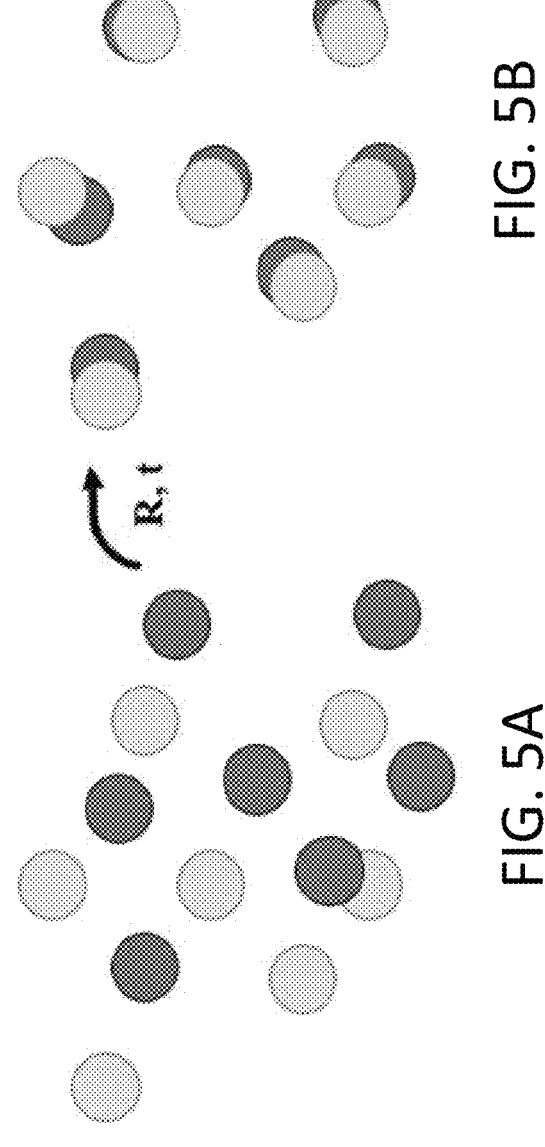
FIG. 5A illustrates a predicted right mesh and an original right mesh, in accordance with embodiments of the present disclosure.
FIG. 5B illustrates a transformed predicted right mesh and an original right mesh.
Figure 6:
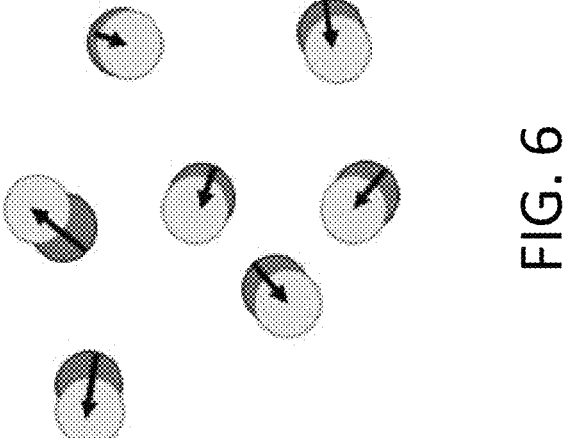
FIG. 6 illustrates local displacement vectors for each vertex of the transformed predicted right mesh.

FIGS. 5A, 5B, and 6 illustrates the proposed framework of the present disclosure. For simplicity, only the mesh vertices are shown. FIG. 4(A) illustrates the predicted right mesh (darker circles) and the original right mesh (lighter circles). FIG. 4(B) illustrates the transformed predicted right mesh (darker circles) and the original right mesh (lighter circles). FIG. 6 illustrates local displacement vectors for each vertex of the transformed predicted right mesh. Accordingly, as illustrated in FIGS. 5A, 5B, and 6, the predicted right mesh is aligned with the original right mesh using the global transformation. Subsequently, the local displacements are found.

According to one or more embodiments, the global displacement transformation may be estimated at any subdivision level. In one or more examples, a subdivision level may correspond to a decimation process. For example, a decimation process may be performed on the original mesh to reduce the number vertices, thereby creating a subdivision level. The decimation process may be repeated to create further subdivision levels.

The global transformation may be estimated in two ways. One way is to estimate the global transformation using the meshes at subdivision level X for faster computation. The second way is to use the global transformation obtained from meshes at subdivision level X as an initialization and later perform a fine tuning on the meshes which have all the vertices.

The above proposed methods are not restricted to be used for symmetric (e.g., left and right) prediction. They may be used to predict one part of the mesh (or subdivided mesh) from another part of the mesh (or subdivided mesh).

According to one or more embodiments, a decoder such as decoder 210 (FIG. 2), may receive a bitstream generated by the encoder. The bitstream may comprise the encoded vertices on the left side of the mesh, displacement vectors, and an indication of the transformation function. The decoder may decode and reconstruct each vertex on the left side of the mesh. The decoder may determined the predicted symmetric vertex on the right side of the mesh for each vertex on the left side. The decoder may apply the transformation function to each predicted symmetric vertex. The decoder may subsequently determine each original vertex in the right side of the mesh by applying the displacement vector to each transformed predicted symmetric vertex.

The techniques, described above, may be implemented as computer software using computer-readable instructions and physically stored in one or more computer-readable media. For example, FIG. 7 shows a computer system 700 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 7:
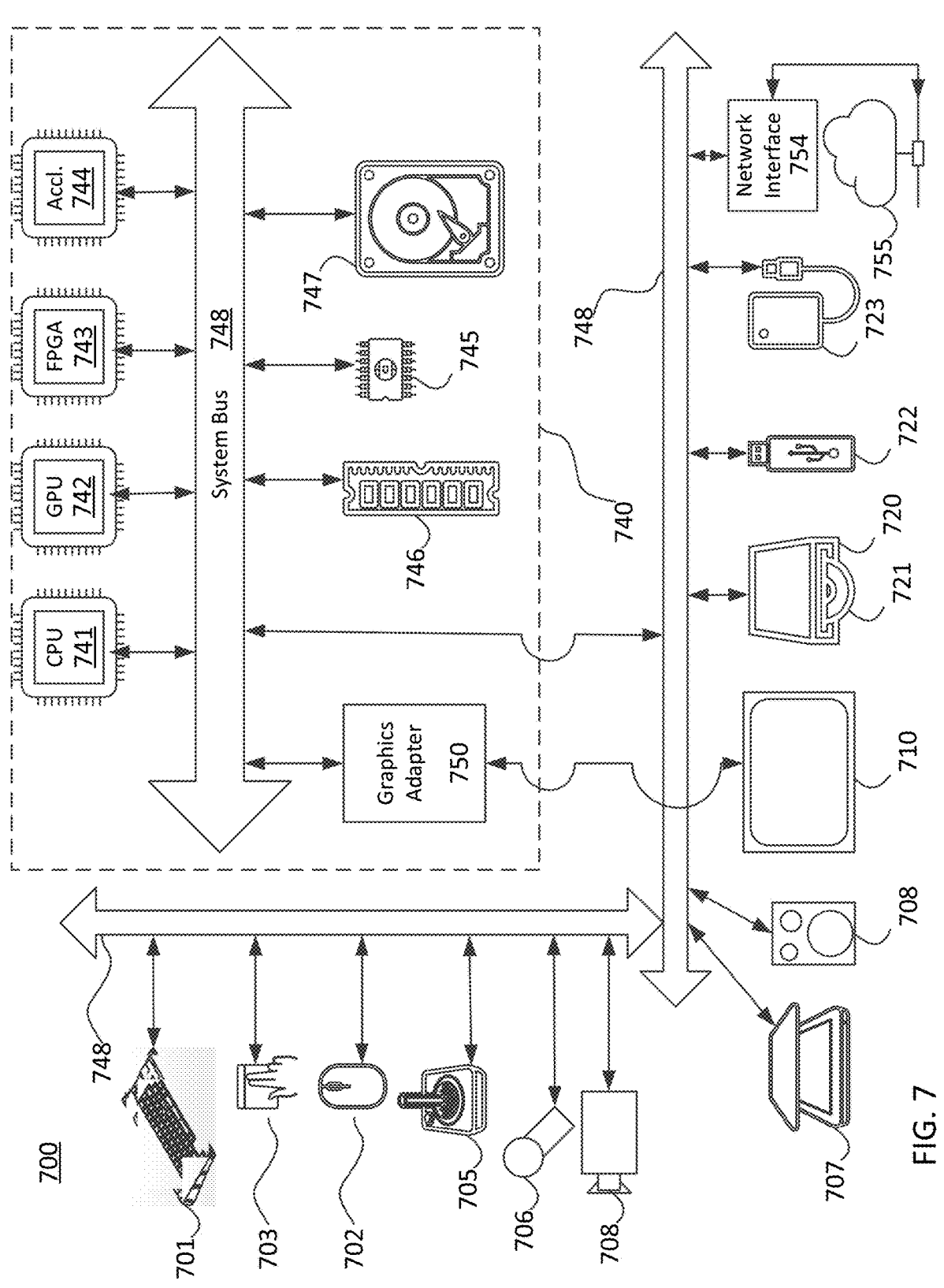
FIG. 7 is a diagram of a computer system suitable for implementing the embodiments of the present disclosure.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there may also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 700 may also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 755. Certain protocols and protocol stacks may be used on each of those networks and network interfaces as described above.

Aforementioned human interface devices, human-accessible storage devices, and network interfaces 754 may be attached to a core 740 of the computer system 700.

The core 740 may include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 may be accessible in the form of one or more physical plugs to enable extensions by additional CPUs, GPU, and the like. The peripheral devices may be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 may execute certain instructions that, in combination, may make up the aforementioned computer code. That computer code may be stored in ROM 745 or RAM 746. Transitional data may be also be stored in RAM 746, whereas permanent data may be stored for example, in the internal mass storage 747. Fast storage and retrieve to any of the memory devices may be enabled through the use of cache memory, that may be closely associated with one or more CPU 741, GPU 742, mass storage 747, ROM 745, RAM 746, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 700, and specifically the core 740 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 740 that are of non-transitory nature, such as core-internal mass storage 747 or ROM 745. The software implementing various embodiments of the present disclosure may be stored in such devices and executed by core 740. A computer-readable medium may include one or more memory devices or chips, according to particular needs. The software may cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system may provide functionality as a result of logic hardwired or otherwise embodied in a circuit (e.g., accelerator 744), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of encoding a mesh, comprising:

determining a symmetry plane that divides the mesh into a first side and a second side opposite the first side, the mesh comprising a plurality of vertices, the first side comprising a first set of vertices, the second side comprising a second set of vertices;

determining, for each vertex in the first set, a predicted vertex on the second side that is symmetric to a corresponding vertex in the first set;

determining, from a plurality of transformation functions, a transformation function that transforms each predicted vertex on the second side, the transformation function determined in accordance with a loss function;

applying the transformation function that transforms each predicted vertex on the second side;

determining a displacement vector between each transformed predicted vertex and a corresponding vertex in the second set, wherein the transformation function minimizes a number of bits for encoding each displacement vector; and

generating a bitstream that comprises each encoded vertex in the first set and each displacement vector.

2. The method according to claim 1, wherein the determining the transformation process comprises performing a registration process between the first set of vertices and the second set of vertices.

3. The method according to claim 2, wherein the registration process outputs, as the transformation function, a rotation function that rotates each predicted vertex on the second side.

4. The method according to claim 3, wherein the registration process outputs, as the transformation function, a translation function that translates each predicted vertex on the second side.

5. The method according to claim 2, wherein the loss function comprises (i) a mean square error function that minimizes the displacement vector between each transformed predicted vertex and the corresponding vertex in the second set and (ii) a cost function that minimizes the number of bits used to encode the displacement vector between each transformed predicted vertex and the corresponding vertex in the second set.

6. The method according to claim 5, wherein the mean square error function is weighted higher than the cost function.

7. The method according to claim 5, wherein the cost function is weighted higher than the mean square error function.

8. The method according to claim 1, further comprising:

performing a decimation on the mesh to reduce the number of vertices in the mesh, wherein the transformation function is applied to the decimated mesh.

9. A method of encoding a mesh, comprising:

generating a bitstream that comprises a portion of the mesh, wherein a symmetry plane is determined that divides the mesh into a first side and a second side opposite the first side, the mesh comprising a plurality of vertices, the first side comprising a first set of vertices, the second side comprising a second set of vertices, wherein, for each vertex in the first set, a predicted vertex on the second side that is symmetric to a corresponding vertex in the first set is determined, wherein a transformation function is determined, from a plurality of transformation functions, that transforms each predicted vertex on the second side, the transformation function determined in accordance with a loss function;

wherein the transformation function that transforms each predicted vertex on the second side is applied, wherein a displacement vector between each transformed predicted vertex and a corresponding vertex in the second set is determined, wherein the transformation function minimizes a number of bits for encoding each displacement vector, and

wherein the portion of the mesh in the bitstream comprises each vertex in the first set and each displacement vector.

10. The method according to claim 9, wherein the transformation process comprises a registration process between the first set of vertices and the second set of vertices.

11. The method according to claim 10, wherein the registration process outputs, as the transformation function, a rotation function that rotates each predicted vertex on the second side.

12. The method according to claim 11, wherein the registration process outputs, as the transformation function, a translation function that translates each predicted vertex on the second side.

13. The method according to claim 10, wherein the loss function comprises (i) a mean square error function that minimizes the displacement vector between each transformed predicted vertex and the corresponding vertex in the second set and (ii) a cost function that minimizes the number of bits used to encode the displacement vector between each transformed predicted vertex and the corresponding vertex in the second set.

14. The method according to claim 13, wherein the mean square error function is weighted higher than the cost function.

15. The method according to claim 13, wherein the cost function is weighted higher than the mean square error function.

16. A method decoding an encoded mesh, comprising:

receiving a bitstream comprising the encoded mesh, wherein the mesh is divided by a symmetry plane that divides the mesh into a first side and a second side opposite the first side, the mesh comprising a plurality of vertices, the first side comprising a first set of vertices, the second side comprising a second set of vertices, wherein, for each vertex in the first set, a predicted vertex on the second side that is symmetric to a corresponding vertex in the first set is determined, wherein a transformation function is determined, from a plurality of transformation functions, that transforms each predicted vertex on the second side, the transformation function determined in accordance with a loss function, wherein the transformation function that transforms each predicted vertex on the second side is applied, wherein a displacement vector between each transformed predicted vertex and a corresponding vertex in the second set is determined, wherein the transformation function minimizes a number of bits for encoding each displacement vector, and wherein the bitstream comprises each encoded vertex in the first set and each displacement vector.

* * * * *